March 9, 1943.  J. W. YOWELL  2,313,610
PRESSURE TRANSMITTER
Filed May 27, 1941
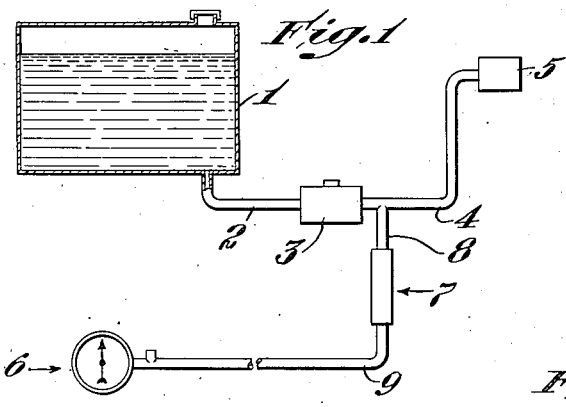
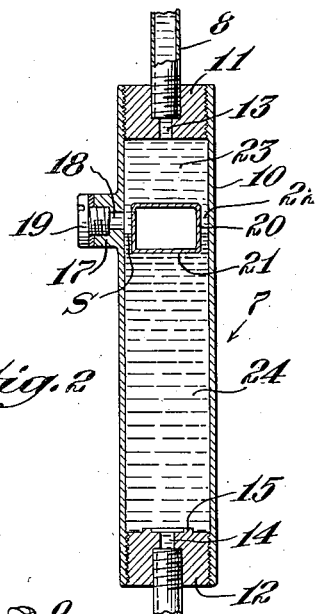
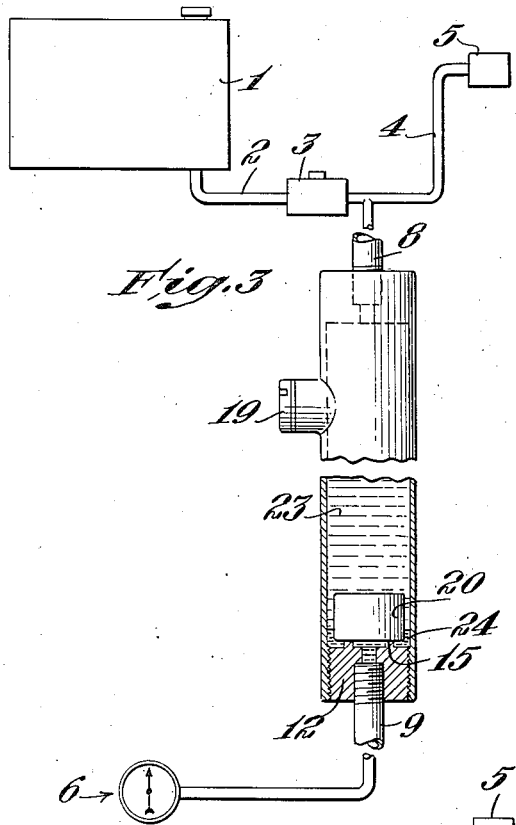
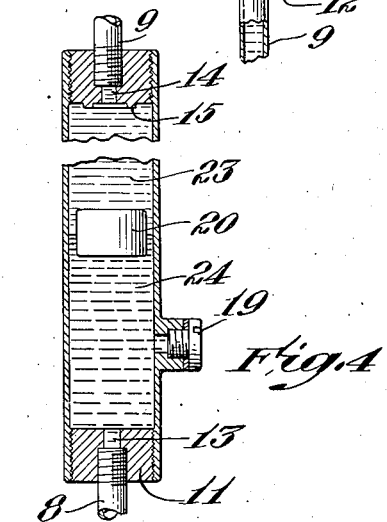
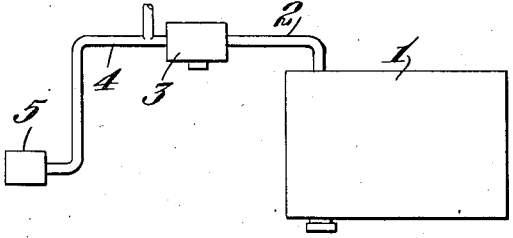
Inventor
Joseph W. Yowell
by Roberts, Cushman & Woodberry
Attys.

Patented Mar. 9, 1943

2,313,610

UNITED STATES PATENT OFFICE 2,313,610

PRESSURE TRANSMITTER

Joseph W. Yowell, Stratford, Conn., assignor to Manning, Maxwell & Moore, Incorporated, New York, N. Y., a corporation of New Jersey Application May 27, 1941, Serial No. 395,471

2 Claims. (Cl. 73—31)

This invention pertains to pressure transmitters by means of which pressure fluctuations in a fuel or oil line for an internal combustion engine or the like are conveyed to a gauge or other indicating or recording means, and relates more particularly to a pressure transmitter of the direct or hydraulic type.

Gauges of the Bourdon tube type and other instruments operated by hydraulic pressure have heretofore commonly employed gasoline, oil, or other inflammable fluid as the pressure-transmitting agent. This constitutes so great a fire hazard that the employment of such prior types of hydraulic transmission in aircraft will doubtless soon be prohibited by law.

Electrical transmitters have been designed (for example, transmitters of the synchronous motor or variable transformer and resistance types), but such transmitters necessitate some outside source of energy and are subject to the hazard of sparking; they tend to introduce a transmission error which materially reduces the overall accuracy of the indicating system; they are usually so delicate as to require a special antishock mounting; they are expensive and unduly heavy; and are limited in respect to the range of pressure to which they are responsive.

Diaphragm-type transmitters are complicated and must be completely assembled as a unit before installation; they tend to introduce a temperature error which is difficult to compensate; they employ transmission tubing and other hollow parts which must be of substantial diameter and thus of undue weight; and they are expensive to manufacture and install and subject to inaccuracy of operation.

The principal object of the present invention is to provide a direct acting or hydraulic pressure transmitter which employs a non-inflammable fluid or a fluid which does not ignite easily or burn freely for actuating the gauge or equivalent device; to provide a transmitter of a simple, inexpensive, durable and accurate type; to provide a transmitter which is light in weight and whose parts may readily be assembled at the point of use; to provide a hydraulic transmitter which acts automatically to cut off the fuel supply line from the gauge in the event that the gauge parts are ruptured or develop any leaks; to provide a transmitter having the desired characteristics of accuracy and dependability and which employs a fluid of such low viscosity that the transmission tubing need not exceed $\frac{3}{16}$ inch in inside diameter, thus reducing weight, and at the same time being operative throughout a temperature range of from —50° C. to 100° C. without objectionable lag characteristics at the lower temperature range; to provide a transmitter which will operate to transmit pressure in substantially any position, for example, when used in an airplane, even though the plane be turned through an angle of 360°; and to provide a transmitter which does not substantially affect the reading of the gauge and which may be employed with standard gauges without requiring recalibration or modification of the gauge.

Other and further objects and advantages of the invention will be pointed out in the following more detailed description and by reference to the accompanying drawing, wherein Fig. 1 is a diagrammatic elevation of a fluid supply line and pressure gauge having the transmission device of the present invention interposed between such supply line and gauge;

Fig. 2 is a vertical section, to larger scale, illustrating the pressure-transmitting device of the present invention with its parts in normal operative position;

Fig. 3 is a view similar to Fig. 2, but showing the transmitter with its parts in the position which they assume in the event that the gauge is ruptured or substantial leakage develops in the gauge or its connections; and Fig. 4 is a view similar to Fig. 3, but showing the position which the parts of the transmitter assume when the transmitter is held in inverted position for an extended period.

Referring to the drawing, the numeral 1 designates a receptacle for fluid, for instance, gasoline or other fuel, or oil, designed for use in the operation of an internal combustion engine or hydraulically operated mechanism. Hereinafter this fluid may be referred to for convenience simply as "fuel," but such designation is not intended to have any limiting effect. From the reservoir 1 a pipe 2 leads to the fuel or oil pump 3, and from the pump the pipe 4 extends to the carburetor 5 or engine or equivalent device. The numeral 6 designates a pressure indicating or recording instrument, for instance a Bourdon tube pressure gauge, while the numeral 7 designates in general the improved pressure transmitter of the present invention. The upper end of this pressure transmitter is connected by a pipe 8 to the delivery pipe 4 which leads from the pump to the carburetor, while the lower end of the transmitter is connected by a conduit 9 to the gauge 6. Preferably the pressure transmitter 7 is located quite close to the pump 3 but, on the other hand, the conduit 9 may be of considerable length so that the gauge 6 may be located in any convenient position for observation by the operator of the engine. For instance, this gauge 6 may be placed in the cockpit of an airplane.

Referring to Fig. 2, in which the pressure transmitter 7 is shown in detail, the numeral 10 designates the casing of this device, such casing being here shown as elongate and substantially cylindrical and consisting, for example, of a length of metal tubing internally screw threaded at its opposite ends for engagement with top and bottom closures or plugs 11 and 12. Instead of screw threading these plugs into the ends of the tubular housing, they may be welded in place to insure against leakage, or the hollow housing may be otherwise made, for instance by casting, if preferred. The upper head or plug 11 is furnished with an internally screw-threaded bore for the reception of the end of the pipe 8 or, if preferred, the pipe may be welded into this bore, the inner portion 13 of this bore preferably being reduced in diameter as compared with that which receives the end of the pipe to form an inlet port and preferably being of the order of 0.098 inch in diameter or less. In the same way the pipe 9 is connected to the lower head 12 of the housing, being coaxial with the port 14 which is preferably of substantially the same diameter as the port 13 above described. Coaxial with the port 14 there is provided an annular valve seat 15 formed on the inner or upper surface of the plug 12.

Preferably the housing or casing 10 is provided with a projecting boss 17 which may be welded to the housing 10 if the latter is made of tubing, or which may be integral therewith if the casing or housing 10 is a casting or the like, such boss 17 providing a passage 18 which leads to the interior of the housing 10 and which is normally closed by a screw-threaded plug 19 suitably packed to prevent leakage. The passage 18 provides means whereby fluid may readily be introduced into the interior of the housing 10.

In the elongate chamber provided by the housing 10 there is arranged a movable valve device 20. This valve device is preferably hollow or at least so constructed as to be buoyant and is of such diameter as to permit it to move endwise in the cylindrical chamber in the housing 10 without frictional contact with the walls of the latter. This valve device has a lower valve surface 21 which is designed at times to engage the valve seat 15 and thus to close the entrance to the port 14 leading to the pipe or conduit 9. As here illustrated, the valve device 20 is a hollow metallic body of substantially cylindrical shape having flat upper and lower ends.

If the pressure transmitter is to be used, as above suggested, in a system in which gasoline is the fluid which is delivered under pressure, then the lower part at least of the chamber within the housing 10 is filled with fluid, for example ethylene glycol solution, such body of fluid being indicated at 24. The fluid employed should be non-inflammable, or at least poorly combustible and not readily ignited. The ethylene glycol solution, referred to is of this latter class. When hereinafter reference may be made to this fluid as being "non-inflammable," it is to be understood as meaning fluids which are not readily ignited as well as those which are completely non-combustible. This body of fluid is preferably arranged normally to fill the chamber in the housing 10 substantially to the level of the filling opening 18, the same fluid also extending through the conduit 9 and preferably filling the Bourdon tube of the instrument 6. The upper part of the chamber in the housing 10 becomes filled with the gasoline which is delivered by the pump 3 into the pipe 4 and which flows from the latter through the pipe 8 so as to form a body 23 of gasoline above the glycol solution. The buoyancy of the valve 20 is such that the latter floats on the glycol solution but does not float in the gasoline, so that this valve device tends to remain substantially in the plane of the surface of contact S of the two fluids.

In the normal operation of the device with the parts arranged as indicated in Figs. 1 and 2, the valve 20 is disposed at a position intermediate the ends of the chamber in the housing 10, dependent upon the initial level of the glycol solution, and the position of the valve does not vary greatly during operation. Since this valve is free to move longitudinally in the chamber in the housing 10 and preferably does not contact the side walls of the chamber, pressure variations in the body 23 of gasoline in the upper part of the chamber are transmitted without lag or variation to the body 24 of glycol solution in the lower part of the chamber and thence through the conduit 9 to the indicator 6. Thus pressure fluctuations in the delivery pipe 4 which leads from the pump to the carburetor are transmitted substantially instantaneously as hydraulic pressure variations directly to the indicator, and the latter at all times accurately shows the pressure of fluid being delivered to the carburetor. While there is a direct hydraulic transmission of pressure from the fuel delivery pipe 4 to the indicator, the conduit 9 does not contain an inflammable fluid and thus there is no danger that rupture of the conduit 9 or any part of the gauge structure will result in immediate delivery of inflammable material into the cockpit of the airplane or other place at which the instrument 6 is located.

If such rupture of the conduit 9 of the gauge should take place, the level of the glycol solution drops within the chamber in the housing 10 and the valve 20 moves down at the same time until the surface 21 of the valve device engages the seat 15, thus completely shutting off the entrance to the conduit 9 so that gasoline is not permitted to follow the glycol solution out through the port 14 and thus through the conduit 9 to the vicinity of the gauge. This condition is illustrated in Fig. 3 where the valve 20 is shown seated on the seat 15. When seated, the valve is exposed to differential pressure at its opposite faces, thus pressing it to its seat to afford an effective seal. It will be noted by reference to this figure that the seat 15 is somewhat elevated above the inner surface of the plug 12 and thus a small body of the glycol solution is entrapped at the lower end of the chamber, thus helping to form a seal at the point where the valve engages the seat so that escape of the gasoline beneath the valve is effectively prevented. While a flat valve seat is preferred, a beveled or conical seat surface might be employed, and the lower surface 21 of the valve device 20 provided with a conically shaped valve element. By the use of such a seat and valve element, having accurately finished surfaces, all leakage can easily be prevented when the valve is seated.

Assuming that this device is to be employed in an airplane, it will readily be appreciated that because of the freedom of movement of the valve 20 within the housing 10 the valve will operate satisfactorily in the manner above described to close the port 14 even though the axis of the transmitter be tipped to an angle of as much as 60° to the vertical.

Even though the airplane should be flown upside down, so that the parts assume the position shown in Fig. 4, the transmitter will still be effective accurately to transmit pressure variations in the delivery pipe 4, without substantial change, through the conduit 9 to the gauge. If the airplane be flown in this position for any substantial length of time, the bodies 23 and 24 of gasoline and glycol respectively will interchange their positions within the housing 10, as indicated in Fig. 4; but since the port 13 is of so small diameter, as above suggested, the surface tension of the glycol, which is slightly more viscous than gasoline, is sufficient to prevent the glycol from flowing down through the pipe 3 into the gasoline delivery pipe 4, and thus the device continues to function in so far as transmission of pressure variations is concerned, even though used in this abnormal position. However, when used in this position the valve 20 is inoperative to close the port 14 in event of rupture of the pipe or conduit 9.

While one desirable embodiment of the invention has been illustrated by way of example, it is to be understood that the invention is not necessarily limited to the precise details of construction illustrated, but is to be regarded as broadly inclusive of all equivalent arrangements falling within the terms of the appended claims.

I claim:

1. In combination in a system comprising a source of inflammable fluid under pressure, a device for indicating the pressure of said fluid and a pressure transmitter interposed between said source and the indicating device, the pressure transmitter comprising a vertically elongate cylindrical shell consisting of a length of tubing screw threaded at its opposite ends, top and bottom closures having threaded engagement with the opposite ends of said length of tubing, the upper closure having an axial bore whose outer portion is designed to receive one end of a pipe leading from the source of inflammable fluid, the lower closure also having an axial bore whose outer portion is designed for the reception of one end of a pipe leading to the pressure indicating device, the upper surface of the lower closure having an annular, upstanding rib coaxial with the bore in said lower closure, the upper surface of said rib constituting an elevated valve seat, said seat being of such external diameter as to provide an annular fluid trap between it and the wall of the shell, the upper end of the shell, when in use, being normally filled with the inflammable fluid, the remainder of the shell, when the device is in use, being normally filled by a body of non-inflammable fluid which is immiscible with the inflammable fluid and which normally directly contacts the inflammable fluid, the non-inflammable fluid being of greater specific gravity than the inflammable fluid, the inner portion of the bore in the upper closure being of a diameter so small that, if the transmitter be inverted, the surface tension of the fluid of greater specific gravity will prevent flow of the latter outwardly from the interior of the shell through said bore, and a buoyant valve device of lesser external diameter than the internal diameter of the shell, said valve device being of such buoyancy as to float upon the heavier fluid substantially at the surface of contact of the two fluids, and being freely movable in response to variations in the level of the surface of contact of the two fluids, and being operative, in response to an abnormal drop in level of the surface of contact, to rest upon the annular seat and thereby close the passage leading to the gauge, the annular trap surrounding the valve seat being operative to retain a body of the heavier fluid thereby to provide a seal at the point where the valve engages the seat.

2. In combination in a system comprising a source of inflammable fluid under pressure, a gauge for indicating the pressure of said fluid and a pressure transmitter interposed between said source and the gauge, the pressure transmitter comprising a part having therein a vertically elongate chamber of fixed dimensions which communicates, by means of normally open passages at its opposite ends respectively, with said source and with the gauge, the first-named end of the chamber being normally filled with the inflammable fluid, and a body of non-inflammable fluid filling the remainder of the chamber, said non-inflammable fluid being of greater specific gravity than and immiscible with the inflammable fluid and directly contacting the latter, the passage leading from the chamber to the source of inflammable fluid being of a diameter so small that, if the chamber be inverted, the surface tension of the fluid of greater specific gravity will prevent flow of the latter outwardly from the chamber along said passage, and a float valve in the chamber, the valve being of such buoyancy as normally to be located substantially at the surface of contact of the two fluids, said float valve being operative in the normal position of the transmitter to close the passage leading to the indicating device whenever the surface of contact of the fluids drops abnormally in response to accidental leakage of the heavier fluid from the chamber.

JOSEPH W. YOWELL.